United States Patent [19]

Martens et al.

[11] Patent Number: 4,638,630
[45] Date of Patent: Jan. 27, 1987

[54] COOLDOWN CONTROL SYSTEM FOR A COMBINED CYCLE ELECTRICAL POWER GENERATION PLANT

[75] Inventors: Alan Martens, Berwyn; Bennie E. Snow, West Chester, both of Pa.

[73] Assignee: Westinghouse Electric Corp., Pittsburgh, Pa.

[21] Appl. No.: 686,956

[22] Filed: Dec. 27, 1984

[51] Int. Cl.$^4$ .............................................. F02C 6/18
[52] U.S. Cl. .................................................. 60/39.182
[58] Field of Search ........................ 60/39.13, 39.182; 122/7 R

[56] References Cited

U.S. PATENT DOCUMENTS 4,362,013  12/1982  Kuribayashi ..................... 60/39.182
4,532,761  8/1985  Takaoka et al. ................... 60/39.13

Primary Examiner—Louis J. Casaregola
Attorney, Agent, or Firm—Charles M. Lorin

[57] ABSTRACT

In a combined cycle electrical power generator plant, the shut-down process includes a cooldown control period which is minimized before shutting down the gas turbine by detecting first whether a non-steaming condition has been reached and whether the gas turbine has been reduced to minimum load.

4 Claims, 4 Drawing Figures

COOLDOWN CONTROL SYSTEM FOR A COMBINED CYCLE ELECTRICAL POWER GENERATION PLANT

BACKGROUND OF THE INVENTION

In a combined cycle power generation plant a gas turbine is associated with a heat recovery steam generator for the generation of superheated steam which is applied to a steam turbine. The steam turbine is the major source of power, although the gas turbine is concurrently used for generating electrical power. The present invention involves cooling-down of the power generation plant, in general, and more particularly it relates to an improved way of shutting down the gas turbine in such a combined cycle power generation plant. A stopping sequence may be started upon one gas turbine and its associated boiler, independently from the other gas turbines which are still operating to support the generation of steam for the steam turbine under load, or the stopping sequence may be the final step in the process of shutting down the entire plant, steam turbine included.

Before shutting down the gas turbine, the normal procedure is to reduce the load and operating levels on all other operating units, among which the steam turbine and the heat recovery steam generator are of major importance. It is desirable in the shutting down process to let the steam turbine use all the steam available from the steam generator and to shut down the afterburner and slow down the gas turbine first, thereby allowing the steam generator to cool off.

The shutting down of the gas turbine being part of the process of stopping the generation of steam altogether, the source of heat, e.g. the gas turbine, cannot be withdrawn without risk of damaging the installation. In this respect the high pressure drum in the boiler comes into consideration on two counts:

First, the supply of heat to the superheater which normally generates superheated steam, should be stopped only when the steam outputted is dry. Once the hot air from the afterburner into the stack has been stopped, the hot boiler will cool off, which will fill up the tubes of the high pressure evaporator with water, rather than with steam, while the high pressure circulating pump is working.

Secondly, at the moment the heat source is withdrawn altogether by cutting off the gas turbine, the high pressure evaporator should have stopped bubbling. This is important, otherwise the circulating pump of the boiler could be working on a column of gas, causing the bubbles to collapse and damaging the pump. Instead, there should be no steam, only water, in the tubes. By the same occurrence, the circulating pump will fill up the tubes in the HP drum, thus keeping the water at the desired level ready to start again, when necessary.

For the purpose of this disclosure, U.S. Pat. Nos. 3,924,141; 3,953,966; and 4,151,712 are hereby incorporated by reference.

SUMMARY OF THE INVENTION

When the request to stop the gas turbine associated with a heat recovery steam generator is being initiated, it is determined at least whether, as a first condition, the heat recovery steam generator has reached a non-steaming status and whether, as a second condition, the load of the gas turbine has been reduced to a minimum. The concurrence of these two conditions is held during a predetermined time interval, the complete shut-down of the gas turbine intervening thereafter, but only if said first *and* second conditions are satisfied.

The duration of said predetermined time interval at minimum load, serves the purpose of drying out the superheater prior to shut-down, and of establishing stable water inventory levels in the boiler. In addition, at such minimum load the gas turbine is still producing electricity, the gas turbine being operating as a low energy heat source, while steam flow is being reduced until the "non-steaming" stage.

The cooldown gas turbine controller according to the present invention optimizes the heat rate function of the gas turbine—heat recovery steam generator by (a) generating maximum usable power with the combustion turbine, and (b) minimizing the cooldown time as a result of the "non-steaming" status in the boiler being ascertained.

The "non-steaming" status of the boiler is known from a determination of the gas inlet temperature of the boiler and the superheater outlet pressure, whereby the steaming, or non-steaming status, of the high pressure drum becomes known directly.

If the non-steaming status is detected, the combustion turbine shut-down sequence can be triggered quasi-immediately, thus without having to wait conservatively for a prefixed time interval, typically 15 minutes, of sufficient duration to safely cool down the gas turbine and boiler in the overall shut-down procedure of the combined cycle power plant.

Cooling-down may be accomplished either with the switch breaker open, or the switch breaker closed. In the former alternative, protective circuitry may have caused the breaker to open, without correlative tripping of the combustion turbine.

DESCRIPTION OF THE PREFERRED EMBODIMENTS OF THE INVENTION

Figure 1:
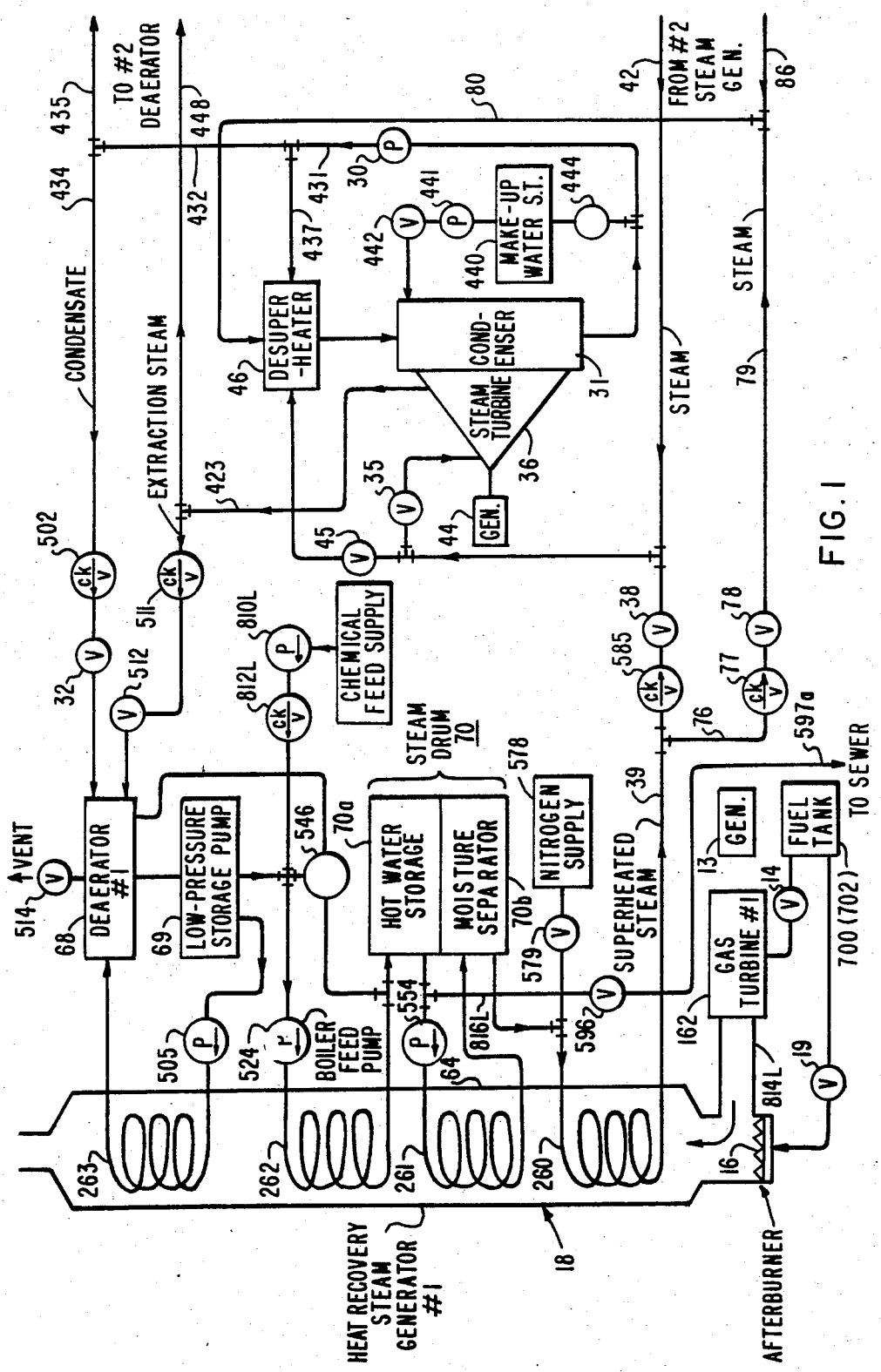
FIG. 1 shows in block diagram a combined cycle electric power plant system as can be used in the preferred embodiment of the invention.

In the normal operative mode the stack of a heat recovery steam generator (HRSG) is heated by the hot gas generated by the combination of a gas turbine and an afterburner. In the HRSG, water from the condensate of the steam turbine is circulated in an enconomizer about a deaerator. The degassed water from the deaerator is pumped into a high pressure evaporator leading to the formation of vapor under the hot gasses flowing counter current to the water in the stack of the heat exchanger. A high pressure drum, as a water storage maintained at the proper level, keeps, through the hot pressure pump, the water at hot temperature circulating in the evaporator. At the last stage, thus near the inlet gasses from the gas turbine and afterburner, the water is converted by the superheater into superheated steam which is supplied directly under flow and pressure outlet conditions to the steam turbine.

The steam turbine cannot be shut down without either bypassing good steam directly to the condenser, or first reducing the generation of steam by the boiler. To reduce the generation of steam by the boiler, the afterburner which is a supplemental source of heat for the inlet gasses is first to be cut-off, e.g., by reducing, then, stopping the supply of fuel thereto. The final stage is when the flame of the afterburner is off.

Taking the afterburner out of operation is followed by reducing the load of the gas turbine, e.g., reducing firing thereof, also through fuel supply decrease. However, the gas turbine cannot be simply shut down while the water cycle of the boiler is still very hot and generating steam. The prior art has approached the problem by establishing conservatively a period of reduced load during which the boiler is going to cool down progressively, and the assumption, gained by experience, is that after such prefixed time interval has elapsed it is safe to shut down the gas turbine totally, e.g., the supply of hot gasses to the HRSG.

The sequence of operation to shut down the gas turbine in a combined cycle electric power plant according to the present invention, are part of an overall shutdown involving the heat recovery steam generator associated with the gas turbine, and the steam turbine coupled with the heat recovery steam generator. As explained in U.S. Pat. No. 3,953,966 the heat recovery steam generator does not need at a time be disconnected from the gas turbine and, rather, while the gas turbine is still running, but at a reduced load level while the afterburner is shut off, the heat recovery steam generator is controlled for passing progressively from a wet state to a dry state, e.g., the latter when there is no water left in the heat exchanger and tanks of the steam generator. Before such ultimate state is reached, the boiler has to be brought from a steaming to a non-steaming state. This is important for the circulating pump of the high pressure evaporator which is carrying highly vaporized fluid between the high pressure drum where steam is present above the level of hot water accumulated in the tank of the drum. The boiler has to be brought to a state of rest for which all storage tanks, (which include the deaerator, as well as the high pressure drum) will have stabilized at a normal level once the circulating pumps have ceased to move fluid to a higher level of energy in the course of the heat exchange process. At the moment of shut-down, the boiler no longer passes superheated steam toward the steam turbine and the generation of steam is stopped altogether as the gasses in the stack of the heat exchanger becomes cooler after the afterburner has been shut off and the gas turbine reduced to minimum load.

As steam pressure in the conduits of the boiler is being reduced by lack of energy to sustain superheat condition, bubbles are forming in the storage tank of the drum and, under the circulation pump force, they will collapse thereby damaging the pump by cavitation under the pressure column.

Referring to FIG. 1, a combined cycle electric power plant is shown in a simplified manner to include a gas turbine 162 driving an electric generator 13. The exhaust gas from gas turbine 162 passes through a duct 814L and up through a stack structure 64 of a heat recovery steam generator 18. Located within the stack structure 64 are four sets of boiler tubes 260-263. Tube set 263 is known as the low pressure evaporator, tube set 262 is known as the economizer, tube set 261 is known as the high pressure evaporator and tube set 260 is known as the superheater.

Additional heat is supplied to the stack structure 64 by an afterburner 16 which imparts additional heat to the gas turbine exhaust gas. Fuel for the gas turbine 162 is supplied by way of a control valve 14 from a fuel tank 700. Fuel is supplied to the afterburner 16 by way of a further control valve 19 from the same fuel tank 700.

Considering the heat recovery steam generator 18, the water, or condensate, located in a lower reservoir (hot well) of a condenser 31 is pumped by a condensate pump 30 to a deaerator 68 by way of condensate lines 431, 432 and 434, a check valve 502 and a condensate control valve 32. Deaerator 68 serves to remove dissolved gases from the condensate, which gases are vented to the atmosphere by way of a deaerator vent valve 514 which is normally open. The deaerated condensate is, then, passed to and stored into a lower pressure storage tank 69.

Water in the storage tank 69 is pumped by a low pressure circulation pump 505 through the low pressure evaporator tubes 263 and back to the deaerator 68. The low pressure evaporator tubes 263 convert the water supplied thereto by pump 505 into low temperature steam, which is then used to provide some preliminary heating of the condensate in the deaerator 68 and storage tank 69. This raises the temperature of the water in the storage tank 69 to a value of approximately 300° F.

Warm water is pumped from the storage tank 69 by a boiler feed pump 524 through the economizer tubes 262 and into the hot water storage section 70a of a steam drum 70. Steam drum 70 also includes a moisture separator section 70b. In the actual construction, the storage section 70a is located below the separator section 70b. Economizer tubes 262 raise the temperature of the water to approximately 550° F., which temperature is just slightly below the boiling point at the pressure existing in the economizer tubes 262 and hot water storage section 70a.

A high pressure circulation pump 554 pumps the hot water from the storage section 70a into the high pressure evaporator tubes 261. Such evaporator tubes 261 convert the hot water into steam. This steam, which is in a wet condition, is supplied to the moisture separator section 70b. Moisture separator 70b removes the moisture and the resulting dry steam is supplied to the superheater tubes 260. Superheater tubes 260 raise the temperature of the steam from approximately 675° F. (at the output of moisture separator 70b) to a temperature of approximately 950° F. at the output of superheater tubes 260.

This superheated steam is supplied by way of a steam line 39, a check valve 585, a normally open main steam stop valve 38, a steam line 34 and a throttle valve 35 to a steam turbine 36. This drives the steam turbine 36 which, in turn, drives a second electric generator 44. The spent steam leaving the exhaust end of steam turbine 36 passes into the condenser 31 which converts the steam back to condensate water at a temperature of approximately 100° F. This completes the primary steam/condensate loop.

Valve 45 is a main steam turbine bypass valve which is selectively manipulated to pass some of the superheated steam to a desuperheater 46 which cools the superheated steam and returns it to the condenser 31. The cooling action in the desuperheater 46 is provided by the lower temperature condensate supplied thereto by way of a branch condensate line 437 from the condenser 31.

Some of the steam is extracted from the steam turbine 36 at an intermediate stage therein by means of an extraction steam line 423. The extracted steam is then supplied, by way of a check valve 511 and an extraction steam control valve 512, to the deaerator 68 to provide additional heating of the condensate in the deaerator 68. The main reason for doing this, is to keep the exhaust pressure at the exhaust end of the steam turbine 36 at a desired low level.

Figure 2:
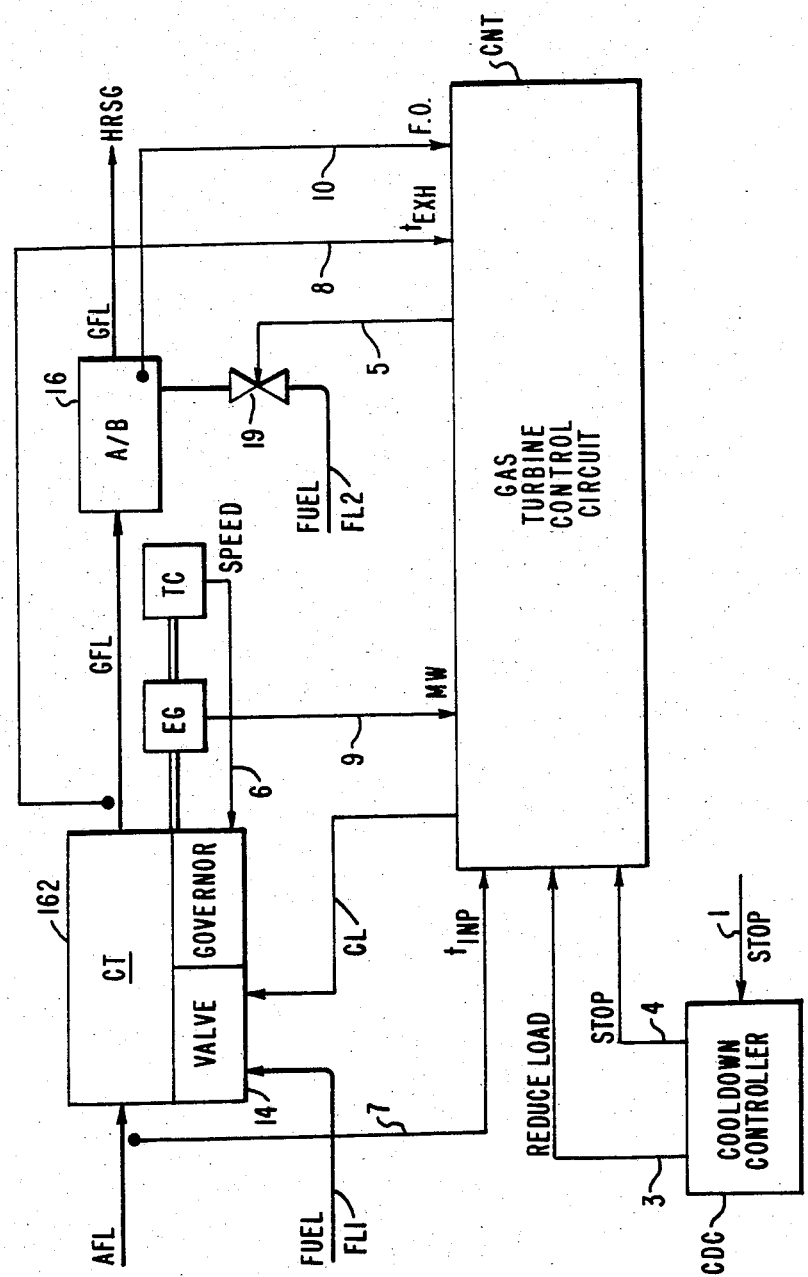
FIG. 2 shows the gas turbine cooldown controller according to the invention associated with the control circuit of the gas turbine.
Figure 3:
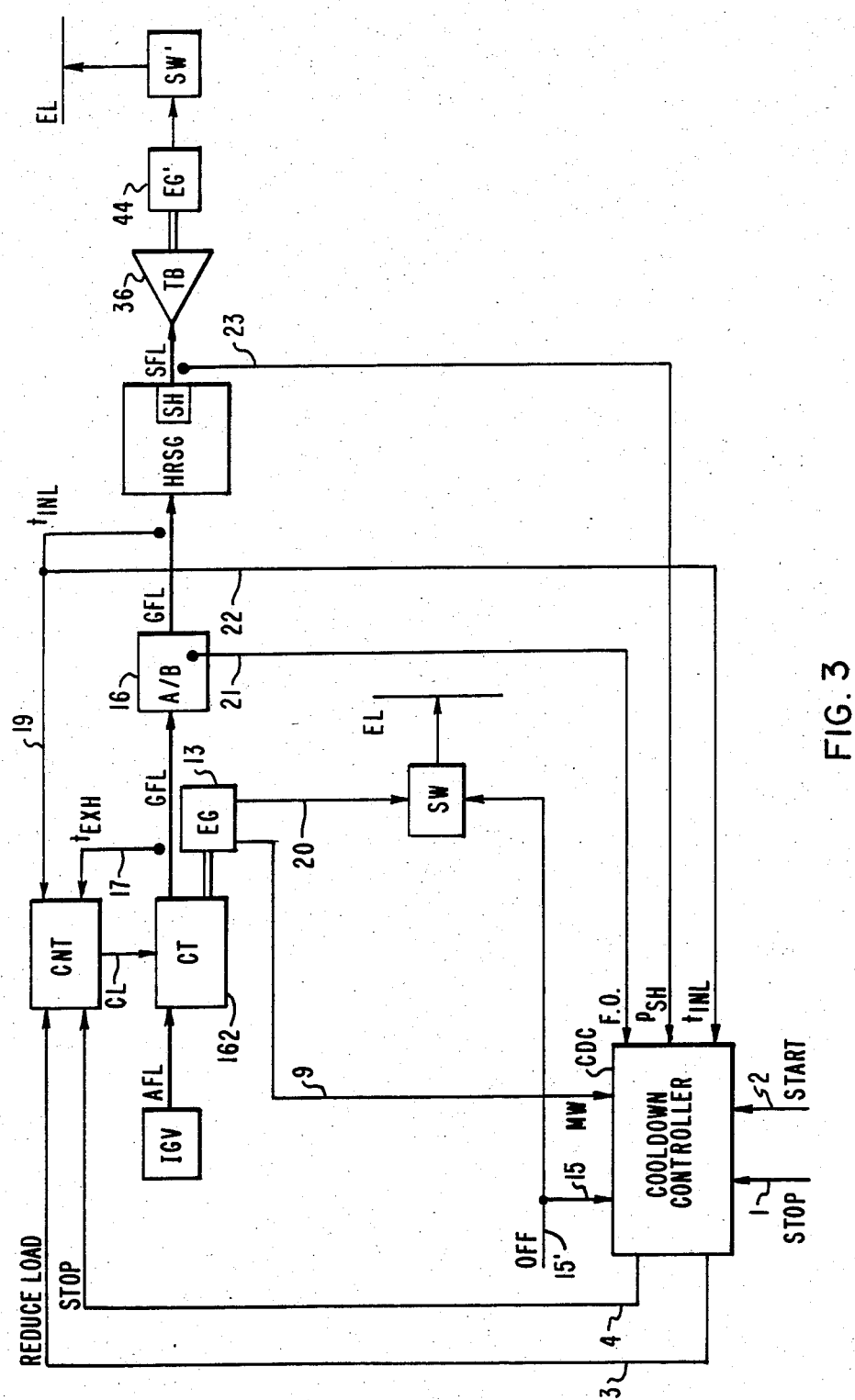
FIG. 3 shows the cooldown controller of FIG. 2 inserted in circuit with various operative points derived from the combined cycle power plant system for control of the gas turbine therein.

Referring to FIG. 2, the gas turbine control circuit (CNT) is shown in block diagram coupled to the combustion turbine (CT) and the afterburner AB. Air flow by an air flow line AFL into the gas turbine leads hot air and gas exhaust along line GFL into the after burner. Gas flow from the afterburner goes to the gas inlet of the stack of the heat recovery steam generator (HRSG), or boiler. The gas turbine is coupled to an electrical generator (EG). A tachometer TC mounted on the shaft of the electrical generator provides by line 6 a speed signal used by the governor of the gas turbine. Control circuit CNT responds, as generally known, to the air input temperature $t_{INP}$ turbine (as can be modified by IGV's control) derived on line 7, to the gas exhaust temperature $t_{EXH}$ derived on line 8, to a megawatt or load signal derived on line 9. Control circuit CNT is also responsive to a stop signal applied by lines 1 and 4 (through a cooldown controller CDC), as explained hereinafter, to cause the gas turbine to be shut off. Control of the gas turbine is by line CL from the control circuit CNT to the fuel valve 14 of the gas turbine controlling the supply of fuel by line FL1. The after burner is supplied with fuel by line FL2 through a valve 19 controlled by line 5 from the gas turbine control circuit, in accordance with a proper control sequence.

In accordance with the present invention, a cooldown controller CDC is provided which responds to a triggering signal on line 1 to stop the gas turbine by establishing a logic sequence for the generation of a command signal on line 4 to the gas turbine control circuit, following a control signal on line 3 to initially reduce the load of the gas turbine. The operation of the afterburner AB is taken into consideration. While the control circuit CNT causes the afterburner to be shut off, by line 5 and valve 19, the flame-out condition in the afterburner is detected and, by line 10, such condition is ascertained by the cooldown controller CDC.

Figure 4:
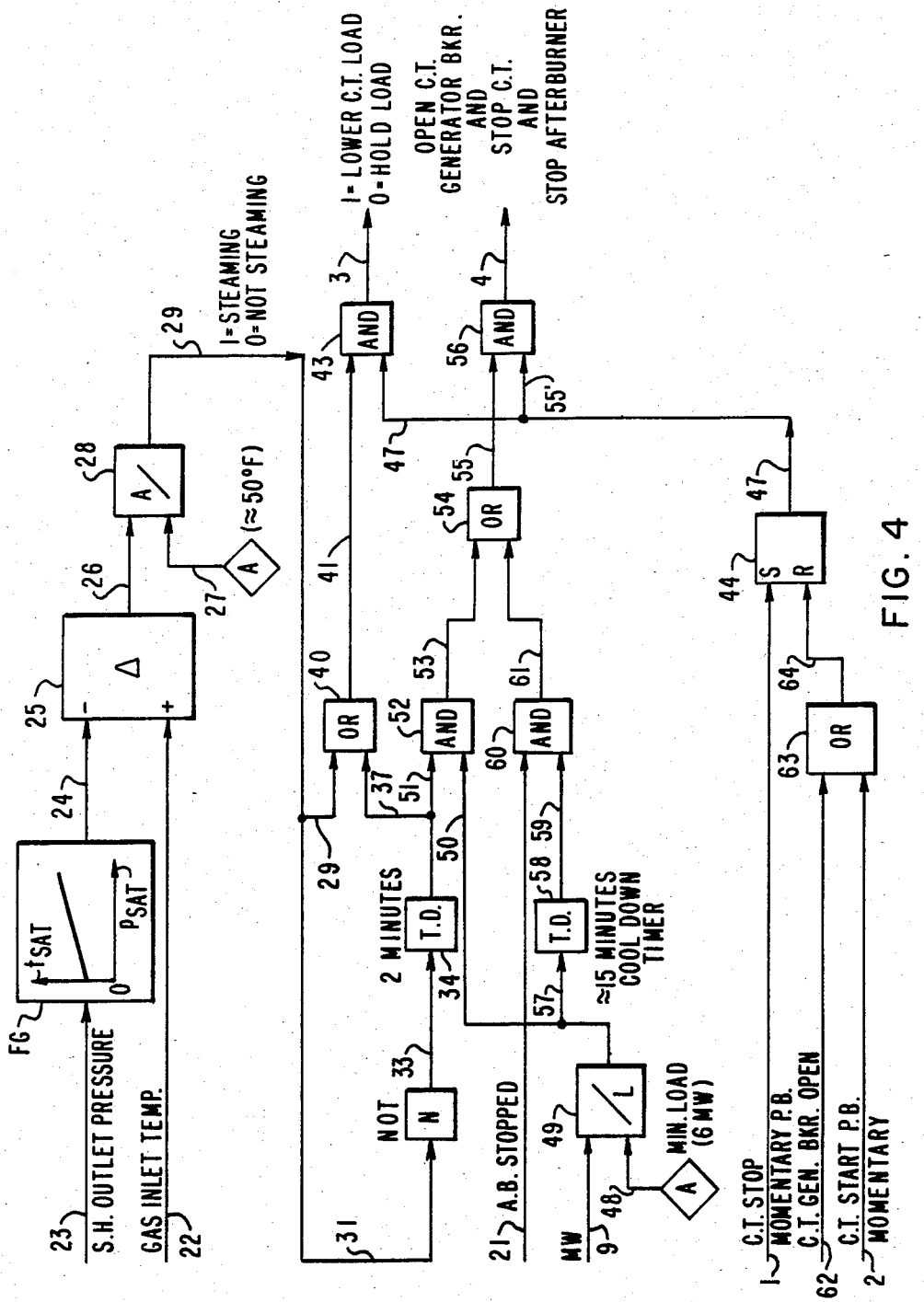
FIG. 4 is circuitry illustrative of the cooldown controller of FIG. 3 in the preferred implementation thereof.

Referring to FIG. 4 circuitry of the cooldown controller CDC is shown in block diagram illustratively. The sensed pressure of superheated steam $p_{SH}$, derived from the superheater SH of the heat recovery steam generator HRSG, is applied as a signal by line 23 to a function generator FG converting it into a signal representing the temperature of saturation of steam, outputted on line 24. On line 22 a signal is applied representing the gas inlet temperature $t_{INL}$, e.g., at the inlet to the stack of the HRSG. Subtracter 25 subtracts the temperature of saturation $t_{SAT}$ from the gas inlet temperature $t_{INL}$. ($t_{INL}-t_{SAT}$) is applied on line 26 as an input to a high limit circuit 28 set by line 27 at 50° F., typically. As long as $t_{INL}$ is larger than ($t_{SAT}+50°$ F.), the superheater can be considered as "steaming", whereas upon $t_{INL}<(t_{SAT}+50°$ F.) the "non-steaming" status has been reached by the boiler, thus, a favorable condition for the cooldown process. The logic of line 29 at the output of limit detector 28 is a ZERO when the boiler is non-steaming, ONE when steaming. Line 29 goes to OR device 40, the output of which by line 41 goes to AND device 43. AND device 43 also responds by line 47 to flip-flop 44 which is set to output a ONE by line 1 when the push-button corresponding to stop the gas turbine has been temporarily depressed by the operator. Flip-flop 44 is reset by line 64 in accordance with OR device 63, e.g., either when by line 62 the gas turbine electrical generator breaker SW is open, or when by line 2 the gas turbine START push-button has been temporarily depressed.

Therefore, whenever (1) the steaming status appears as a ONE on line 29, it also appears via OR device 40 at one input of AND device 43, *and* (2) if the gas turbine STOP push-button has put a ONE on line 1, line 47 gives also a ONE at the second input of AND device 43, *then,* line 3 at the output of AND device 43 has a ONE. This means that by line 3 the gas turbine control circuit CNT is told to *reduce* the load of the gas turbine. The cooldown sequence has been initiated.

It is also observed that line 29 also goes by line 31 to a NOT device inverting the logic of line 31 as seen on line 33. A time delay device TD, set at 2 minutes illustratively, carries the logic signal of line 33 onto line 37 which passes through OR device 40 to line 41. Therefore, upon a change of state on line 29, the new logical state will appear inverted on line 37, but only after a 2 minute delay.

Thus, as long as the signal of line 29 is a ZERO, for "non-steaming status", the signal of line 37, after an initial 2 minute delay, has established itself as a ONE. When the signal of line 29 becomes a zero, because the boiler has reached the "steaming" status, for 2 minutes the ONE of line 33 is not applied on line 37. During that time, line 41 has a zero from line 29 as well as from line 37 and the command signal one line 3 at the output of AND device 43 is a zero, thereby to *hold* the load of the gas turbine.

Within the two minute time interval, though, the boiler might have returned to the steaming status because the boiler had not stabilized, and a ONE on lines 29 and 41 will return line 3 to the reduce load command logic. If the boiler is definitely non-steaming, once the two minute delay has expired the logic ONE of line 33 will appear on line 37 and AND device will carry a ONE on line 41. Therefore, provided the push-button of line 1 is still depressed, line 3 will carry anyhow a lower load command logic.

Reducing the load of the gas turbine will bring it, eventually, to a minimum load level, typically 6 MW. This is detected by a low limit detector 49 set by line 48 at 6 MW and an input signal on line 9 representing the gas turbine megawatt output. If the minimum is reached, there is a ONE on line 50 at the output of low limit detector 49. Provided the non-steaming state has also been reached, there is a ONE on line 51 from the time delay device 34, that is 2 minutes after the non-steaming status has occurred. In such case AND device 52 will output a ONE on line 53, which is passed by OR device 54 onto line 55 which is one input line of AND device 56. The second input 55 is also responsive to the logic state of line 47 called for by line 1. Therefore, AND device 56 outputs on line 4 a STOP command signal which causes the gas turbine shut-down process to be effected by the gas turbine control circuit CNT. Thus, when line 4 has the logic ONE, switch breaker SW will be opened, the afterburner stopped (if not already) and the gas turbine brought to a stop by control circuit CNT. If the process of reducing the gas turbine load to a minimum takes 30 minutes (this minimum load being assumed to be reached, on line 50) *and* the boiler has reached the non-steaming condition (this having led to a ZERO on line 29) the shut-down sequence will be exercised under command from line 4, after 30 minutes and 2 minutes counted from the moment the push-button of line 1 has been depressed.

It is observed that the two loops just described, which are converging, from lines 51 and 50 onto AND devices 52 and 56, insure (1) that the boiler is in the non-steaming status for at least 2 minutes *and* (2) that the load of the gas turbine has been reduced to its minimum before the gas turbine can be brought to a stop.

As long as there is a steaming status e.g. ONE on line 29, and by line 29 on 41, the system will by line 3 reduce the load toward the minimum upon a command to stop from line 1. When the occurrence of the minimum load has been detected at 49, the non-steaming status e.g. ZERO, must appear on line 29, translated with a 2 minute delay at 34, on line 51 as a ONE in order to start the shut-down sequence by line 4. Nevertheless, if there is a non-steaming status on line 29 and the load is not at its minimum, the ONE on line 33 will appear on line 37 after the 2 minute delay, thereby causing the gas turbine load to be decreased under a command on line 3. Eventually, on line 50 the minimum condition will be recognized, and AND devices 52, 56 will enable the STOP command signal to appear on line 4.

Independently of a non-steaming status on line 29, if the minimum load has been reached (as shown on lines 50, 57) *and* the afterburner flame is off (as shown on line 21), AND device 60 will establish on line 61, via OR device 54, a ONE on the input line 55 of AND device 56, provided a time delay, typically of 15 minutes (specified by device 58) has lapsed. This 15 minutes cooldown timer is used, as generally known, after the aforementioned initial period required to reach minimum load has itself lapsed. Thus, the minimum delay of 15 minutes established by device 58 insures, irrespective of any knowledge whether the non-steaming status has been reached in the boiler, that after gas turbine minimum load operation has been reached, there is ample time past to make safe the initiation of a STOP command on line 4 in response to the depressed push-button of line 1.

It appears that, in the absence of a non-steaming condition being ascertained, it would take a prefixed time interval of 15 minutes before the gas turbine can be shut down, whereas, in accordance with the present invention as soon as a non-steaming status has been ascertained on line 29, two minutes only are necessary before an effective shut-down command from line 4 is enabled by AND device 52, following the minimum load condition being reached. Besides saving all this time, the cooldown controller of FIG. 4, insures continuity of megawatts generation until the command signal of line 4 stops the gas turbine altogether.

We claim:

1. In a combined cycle electrical power plant including a steam turbine, a heat recovery steam generator for supplying steam to the steam turbine, a gas turbine for supplying heat to the heat recovery steam generator, said steam generator and gas turbine each producing electrical power under load, the gas turbine having a control circuit determining the operation thereof; the combination of:

first means for detecting one of a steaming condition and a non-steaming condition in said heat recovery steam generator;

second means responsive to said steaming condition and to a gas turbine STOP signal for reducing the load of said gas turbine toward a minimum load level;

third means responsive to said non-steaming condition and to said minimum load level being reached for generating a STOP command and applying said STOP command to the control circuit of said gas turbine, thereby to indicate a sequence of steps to stop the gas turbine.

2. The plant of claim 1 with means responsive to said first detecting means for establishing a condition opposite to the condition detected by said detecting means;

with first delay means responsive to said established opposite condition for providing a delay in said established opposite condition in accordance with a first time interval;

said third means being responsive to said first delay means.

3. The plant of claim 2 with said second means being alternatively responsive to said first delay means, the load of said gas turbine being held at a current load level when the heat recovery steam generator has inverted to a steaming condition.

4. The plant of claim 3 with an afterburner being associated with said gas turbine, with second delay means being provided responsive to said minimum load level for establishing a second time interval counted from the occurrence of said minimum load level;

said third means being alternately responsive to said second delay means and to the concurrence of a flame off condition in said afterburner, to generate said STOP command.

* * * * *